US012050501B2

(12) United States Patent
Alessi et al.

(10) Patent No.: US 12,050,501 B2
(45) Date of Patent: Jul. 30, 2024

(54) CONTROL METHOD OF AN APPARATUS FOR ACTIVATING ONE OR MORE FUNCTIONALITIES OF THE SAME

(71) Applicant: STMicroelectronics S.r.l., Agrate Brianza (IT)

(72) Inventors: Enrico Rosario Alessi, Catania (IT); Fabio Passaniti, Syracuse (IT); Michele Alessio Dellutri, San Gregorio di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 193 days.

(21) Appl. No.: 17/867,170

(22) Filed: Jul. 18, 2022

(65) Prior Publication Data

US 2023/0023062 A1   Jan. 26, 2023

(30) Foreign Application Priority Data

Jul. 26, 2021   (IT) .......................... 102021000019808

(51) Int. Cl.
*G06F 1/3231* (2019.01)
*G06F 1/3234* (2019.01)
*G06F 1/3296* (2019.01)

(52) U.S. Cl.
CPC .......... *G06F 1/3231* (2013.01); *G06F 1/3265* (2013.01); *G06F 1/3296* (2013.01)

(58) Field of Classification Search
CPC .... G06F 1/3231; G06F 1/3265; G06F 1/3296; G06F 1/1616; G06F 1/1684; G06F 1/1686; G06F 21/32; G05B 2219/34456

(Continued)

(56) References Cited

U.S. PATENT DOCUMENTS

| 5,844,415 A | 12/1998 | Gershenfeld et al. |
| 6,188,318 B1 | 2/2001 | Katz et al. |

(Continued)

FOREIGN PATENT DOCUMENTS

| EP | 0725960 B1 | 8/2000 |
| EP | 0896678 B1 | 2/2003 |

(Continued)

OTHER PUBLICATIONS

Amoruso et al., "An improved model of man for ESD applications," *Journal of Electrostatics* 49:225-244, 2000.

(Continued)

*Primary Examiner* — Chun Cao
(74) *Attorney, Agent, or Firm* — SEED IP LAW GROUP LLP

(57) ABSTRACT

A control method of an apparatus is provided. The apparatus includes a control unit coupled to a proximity sensor to detect a first distance of a user in a field of view, and coupled to a charge variation sensor to detect an electric/electrostatic charge variation caused by the user in a detection region. The control method includes acquiring a charge variation signal and generating charge variation parameters as a function of the charge variation signal. The control method further includes determining whether a condition on charge variation parameters is verified, and if the condition on charge variation parameters is verified, activating the proximity sensor and acquiring a proximity signal. Proximity parameters are generated as a function of the proximity signal. If a condition on proximity parameters is verified, one or more functionalities of the apparatus are activated.

20 Claims, 5 Drawing Sheets

(58) Field of Classification Search
USPC .......................................................... 713/323
See application file for complete search history.

(56) References Cited

U.S. PATENT DOCUMENTS

| | | | |
|---|---|---|---|
| 6,922,059 B2 | 7/2005 | Zank et al. | |
| 7,489,024 B2 | 2/2009 | Socher et al. | |
| 8,274,386 B1 | 9/2012 | Dea et al. | |
| 10,042,446 B2 | 8/2018 | Yoon et al. | |
| 10,216,266 B2* | 2/2019 | Krulce | G06F 21/32 |
| 10,321,399 B1* | 6/2019 | Bowden | H04W 4/026 |
| 2006/0251293 A1 | 11/2006 | Piirainen et al. | |
| 2014/0232516 A1 | 8/2014 | Stivoric et al. | |
| 2016/0195630 A1 | 7/2016 | Aponte Luis | |
| 2016/0216794 A1 | 7/2016 | Yoon et al. | |
| 2016/0342781 A1 | 11/2016 | Jeon | |
| 2017/0075411 A1* | 3/2017 | Goldsmith | H04W 52/028 |
| 2018/0367656 A1 | 12/2018 | Kim et al. | |
| 2020/0053651 A1* | 2/2020 | Lee | G06F 3/16 |
| 2020/0134151 A1* | 4/2020 | Magi | G06V 40/168 |
| 2020/0174452 A1 | 6/2020 | Zhao et al. | |
| 2021/0312778 A1 | 10/2021 | Passaniti et al. | |
| 2021/0328824 A1 | 10/2021 | Strutt et al. | |
| 2022/0171045 A1 | 6/2022 | Johnston et al. | |
| 2022/0225003 A1* | 7/2022 | Alessi | H04R 1/1041 |
| 2022/0326806 A1 | 10/2022 | Rizzardini et al. | |
| 2023/0025202 A1 | 1/2023 | Rizzardini et al. | |
| 2023/0075382 A1 | 3/2023 | Rivolta et al. | |

FOREIGN PATENT DOCUMENTS

| | | |
|---|---|---|
| EP | 1587041 A2 | 10/2005 |
| EP | 2533219 A1 | 12/2012 |
| EP | 2980609 A1 | 2/2016 |
| EP | 3190569 A1 | 7/2017 |
| EP | 3372460 A1 | 9/2018 |
| EP | 3791787 A1 | 3/2021 |
| KR | 20110061750 A | 6/2011 |
| KR | 1020110061750 A | 6/2011 |
| KR | 20170110436 A | 10/2017 |
| KR | 102160255 B1 | 9/2020 |

OTHER PUBLICATIONS

Ficker, "Electrification of human body by walking," *Journal of Electrostatics* 64:10-16, 2006.

Kurita, "Development of Non-Contact Measurement System of Human Stepping," *SICE Annual Conference*, The University Electro-Communications, Japan, Aug. 20-22, 2008, pp. 1067-1070.

* cited by examiner

CONTROL METHOD OF AN APPARATUS FOR ACTIVATING ONE OR MORE FUNCTIONALITIES OF THE SAME

BACKGROUND

Technical Field

The present disclosure relates to a control method of an apparatus for activating one or more functionalities of the same, and in detail to a control method for activating said one or more functionalities of the apparatus as a function of detections of an optical sensor and of one or more electric and/or electrostatic charge variation sensors.

Description of the Related Art

As known, the improvement of the user experience allows making the use of computers, PCs, portable devices and smart appliances easier and simpler.

In particular, with exemplary reference to the case of a PC, the improvement of the user experience may comprise the automatic reactivation of the PC (i.e., the switching of the PC from the standby state to the use state), which therefore causes the enabling of functionalities such as automatic and zero-touch access to PC files, quick start of the PC, activation of biometric recognition, deactivation of the screensaver, enabling or disabling of functions for energy saving and for improving battery life.

Most of the known solutions that allow the automatic reactivation of the PC are based on optical sensors. However, infrared sensors (in detail, of "Time-of-Flight," ToF, type) generally used for this purpose often have a limited field of view (e.g., of conical shape and typically with an opening angle of around 30 degrees) and consume large amounts of energy mainly due to the continuous use of the IR source. Furthermore, it is known that the automatic reactivation of the PC based on optical sensors may generate false detections based on the presence, in the field of view, of light radiation emitted or reflected by bodies outside the field of view of the optical sensor (also called "Field of View," FoV), and false detections of inanimate and/or animate objects (but different from the PC user, e.g., pets) located in the FoV. Using the known solutions, it is also difficult to discriminate the user's position in order to enable more advanced functions of the PC, to facilitate the use of the PC even in non-optimal positioning conditions of the user relative to the PC.

BRIEF SUMMARY

In various embodiments, the present disclosure provides a control method of an apparatus for activating one or more functionalities of the same, which at least partially overcomes the drawbacks of the related art.

In one or more embodiments, a control method of an apparatus for activating one or more functionalities of the apparatus is provided. The apparatus is usable by a user and includes: a control unit operatively coupled to a proximity sensor configured to detect, when the user is in a field of view of the proximity sensor, a first distance of the user from the proximity sensor correlated to a second distance of the user from the apparatus; and a charge variation sensor configured to detect an electric or electrostatic charge variation caused by the presence of the user in a detection region of the charge variation sensor. The control method includes: acquiring, by the control unit and through the charge variation sensor, a charge variation signal indicative of the presence or absence of the user in the detection region; generating, by the control unit, one or more charge variation parameters as a function of the charge variation signal; determining, by the control unit, whether a condition on charge variation parameters is verified, the condition on charge variation parameters being indicative of the presence of the user in the detection region; in response to the condition on charge variation parameters being verified, activating the proximity sensor and acquiring, by the control unit and through the proximity sensor, a proximity signal indicative of the presence or absence of the user in the field of view of the proximity sensor and of the first distance; generating, by the control unit, one or more proximity parameters as a function of the proximity signal; determining, by the control unit, whether a condition on proximity parameters is verified, the condition on proximity parameters being indicative of the user being in the field of view of the proximity sensor and in a use position of the apparatus; and in response to the condition on proximity parameters being verified, activating, by the control unit, said one or more functionalities of the apparatus.

In one or more embodiments, the present disclosure provides a computer program product storable in the control unit of the apparatus.

In one or more embodiments, the present disclosure provides the control unit of the apparatus.

In one or more embodiments, the present disclosure provides the apparatus including the control unit.

BRIEF DESCRIPTION OF THE SEVERAL VIEWS OF THE DRAWINGS

For a better understanding of the present disclosure, a preferred embodiment is now described, purely by way of non-limiting example, with reference to the attached drawings, wherein.

DETAILED DESCRIPTION

Hereinafter reference is made to the term parameter which is considered herein in a statistical sense, that is, as a value that defines a respective substantially constant quantity of a graph, a function or a population and which therefore describes and identifies it.

Figure 1:
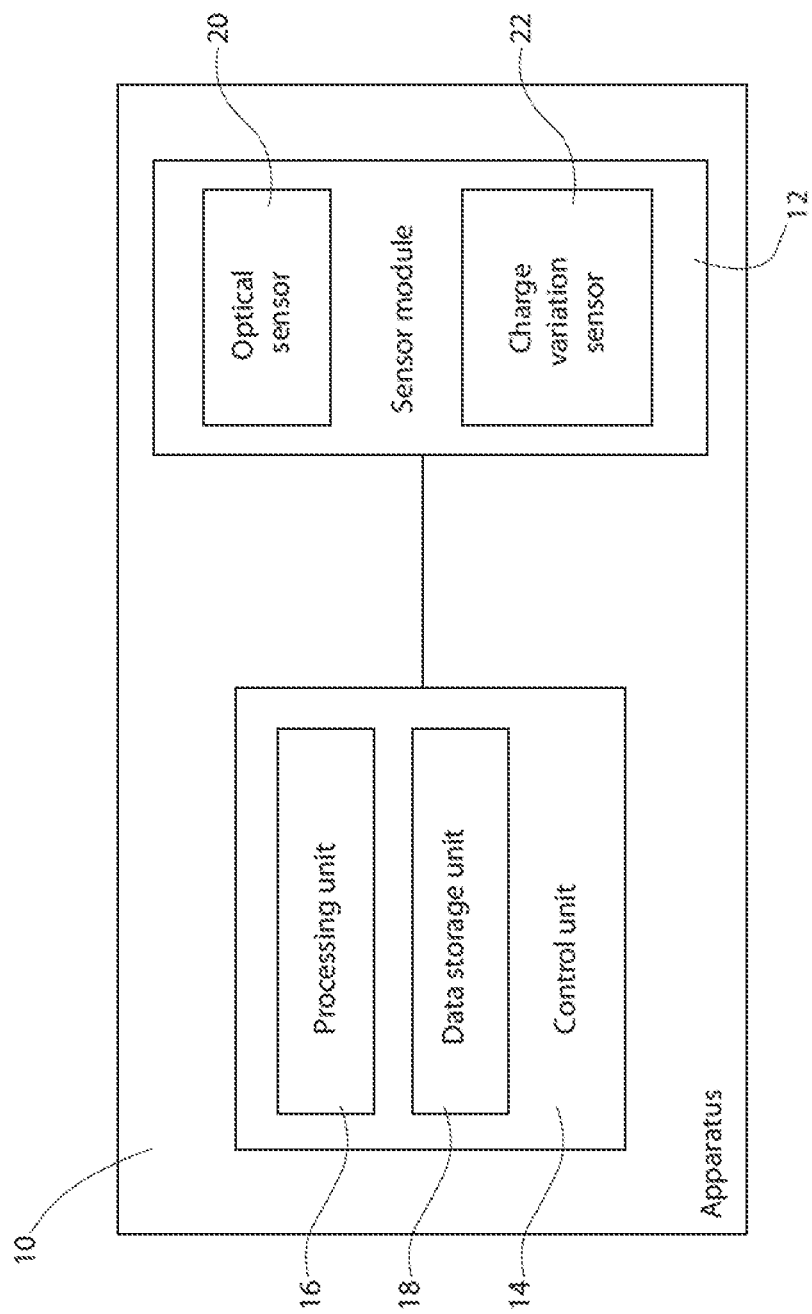
FIG. 1 shows a block diagram of an apparatus comprising a control unit and a sensor module for selectively and automatically activating certain functionalities, according to an embodiment.

FIG. 1 illustrates, schematically, an apparatus 10 according to an embodiment. By way of non-limiting example, the apparatus 10 is an electronic apparatus such as a PC, a tablet, a computer, a portable device (e.g., wearable) or a smart appliance. Hereinafter the case wherein the apparatus 10 is a PC is considered and shown by way of example.

In use and as better described below with reference to FIG. 3, some options and/or configurations of the apparatus 10 are reactivated automatically and selectively when the presence of a user ready to use the apparatus 10 (e.g., sitting in front of the PC) is detected.

The apparatus 10 comprises a control unit 14 operatively coupled to a sensor module 12. In detail, according to an embodiment exemplarily considered below, the sensor module 12 is also comprised in, and/or carried by, the apparatus 10 (and therefore fixed thereto); however, it is still possible, according to a different embodiment, that the sensor module 12 is external to the apparatus 10 and is operatively coupled to the latter (e.g., electromagnetically and/or via the Internet).

As better discussed below, the sensor module 12 is configured to detect data being indicative of an external environment having the apparatus 10 located therein (in particular, of the presence or absence of a user of the apparatus 10 in the external environment), while the control unit 14 is configured to receive and process such data.

For example, the control unit 14 comprises processing circuitry or a processing unit 16 (such as a CPU, a microprocessor, an AP or a dedicated calculation unit) for data processing and a data storage unit 18 (such as a memory, e.g., a non-volatile memory) for storing data, operatively coupled to each other.

In detail, the sensor module 12 comprises an optical sensor 20 and one or more electric and/or electrostatic charge variation sensors (hereinafter referred to as charge variation sensors and identified with the reference number 22). Hereinafter, reference is exemplarily made to the case in which a charge variation sensor 22 is present.

According to an embodiment exemplarily considered below, the optical sensor 20 comprises an infrared, IR, sensor and in detail a time-of-flight, ToF, sensor of a known type; nevertheless, the following considerations apply in a similar manner to any other type of usable optical sensor 20. In greater detail, the ToF sensor is configured to measure a first distance D of the user from the ToF sensor through the emission of IR radiation by an IR source of the ToF sensor and the detection of this IR radiation by an IR detector of the ToF sensor, for example arranged side by side with the IR source. In use, the IR radiation is emitted by the IR source, travels along an optical path until it is reflected by a body, if any, whose relative distance with respect to the apparatus 10 (here the user of the apparatus 10) is to be known, and retraces the optical path in the opposite direction until it reaches the IR detector: by measuring a time of flight between the emission and detection of the IR radiation, it is possible to calculate the first distance D between the user and the ToF sensor, in a per se known manner.

Since the optical sensor 20 is comprised in the apparatus 10 in the exemplarily considered embodiment, the first distance D is equal to a second distance between the user 40 and the apparatus 10. Given this coincidence, hereinafter the second distance is indicated with the same reference as the first distance D. Alternatively, in the different embodiment wherein the optical sensor 20 is external to the apparatus 10, the first distance D is correlated to the second distance between the user 40 and the apparatus 10: in other words, the second distance is a function of the first distance D and may be calculated according to known trigonometric considerations which depend on the relative position between the user 40, the optical sensor 20 and the apparatus 10.

Figure 2:
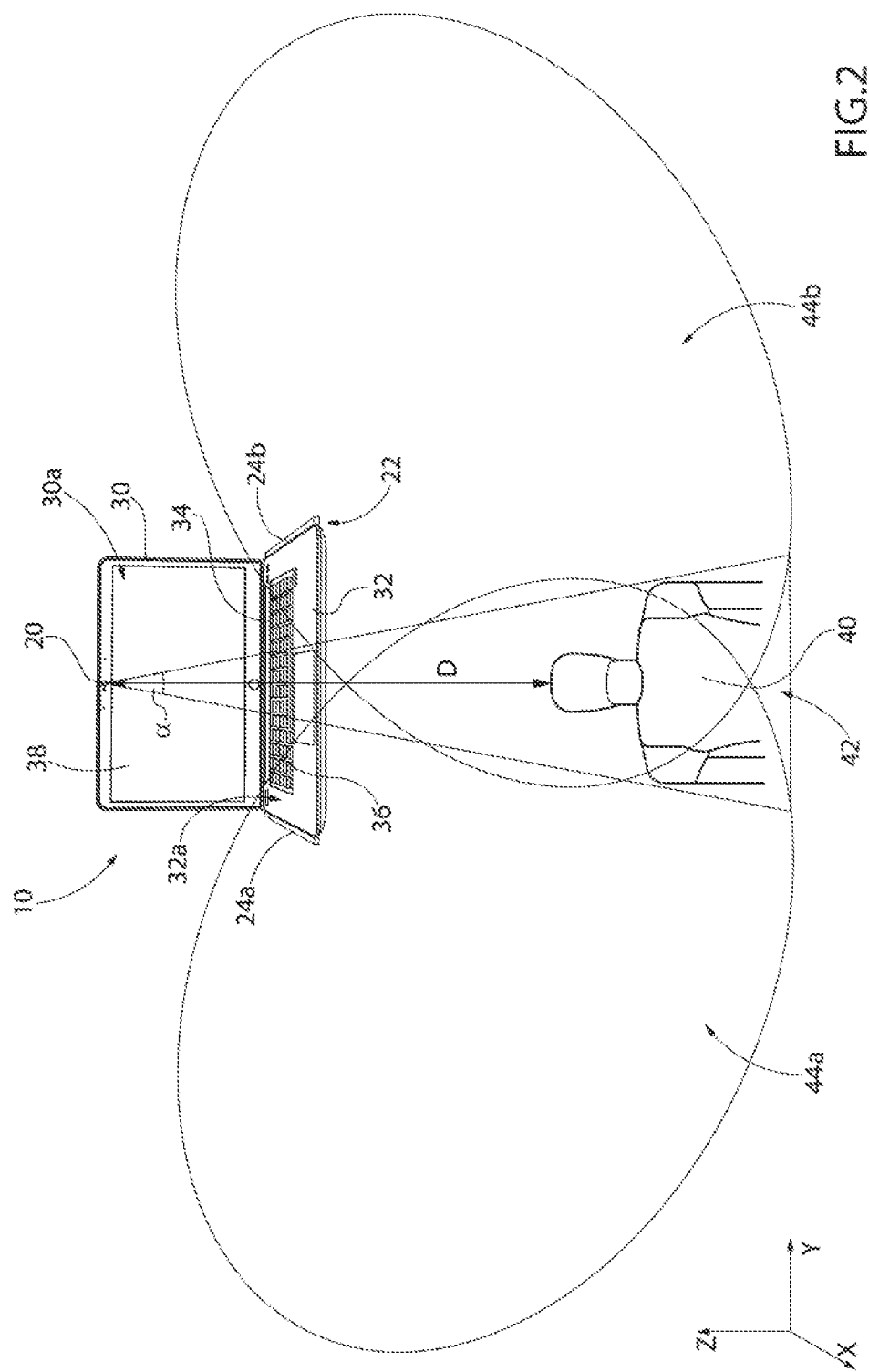
FIG. 2 schematically shows an embodiment of the apparatus of FIG. 1, when it is in use and a user is present.

The charge variation sensor 22 comprises one or more electrodes to detect respective environmental electric/electrostatic charge variations generated by the user. In detail, a first electrode 24a and a second electrode 24b of the charge variation sensor 22 are indicated in FIG. 2. Each electrode 24a, 24b may have a metal surface or be totally of metal coated with a dielectric material, or even have a metal surface arranged under a case of the apparatus 10. In any case, during use each electrode 24a, 24b is electrically/electrostatically coupled to the environment in which the apparatus 10 is present, and in more detail to the user of the apparatus 10, in order to detect the induced electric/electrostatic charge variation thereof.

According to an embodiment, each electrode 24a, 24b is integrated into the case of the apparatus 10, and for example comprises a conductive track formed on, or in, a semiconductor material wafer comprised in the apparatus 10. According to a different embodiment, each electrode 24a, 24b is a metal element present in the apparatus 10, such as the same outer case or a frame of the apparatus 10. Optionally, when a possible use of the apparatus 10 in a humid environment (more specifically in water) is expected, each electrode 24a, 24b is inserted inside a waterproof case, or in any case it is shielded through one or more protective layers, so as to prevent direct contact of the electrode 24a, 24b with water or humidity: in this case, the waterproof case or the one or more protective layers are of a material (e.g., dielectric material, such as plastic) such as not to shield the electric/electrostatic charge generated by the user, which is to be acquired by the electrode 24a, 24b. Other embodiments are possible, as apparent to the person skilled in the art, so that the electrodes 24a, 24b are electrostatically coupled to the user during use.

As exemplarily shown in FIG. 2 in a triaxial Cartesian reference system defined by axes X, Y and Z, the portable device 10 includes a lid portion 30 and a base portion 32, mechanically coupled to each other by a hinge 34 which allows a rotation of the lid portion 30 with respect to the base portion 32, forming a rotation constraint around a rotation axis (in FIG. 2 exemplarily shown parallel to the Y-axis). For example, the base portion 32 comprises at least one interface device 36 (e.g., keyboard and/or trackpad) extending at a surface 32a of the base portion 32, and the lid portion 30 comprises a screen 38 extending at a front surface 30a of the lid portion 30.

In the embodiment shown in FIG. 2, the optical sensor 20 is carried by the lid portion 30 (and therefore is integral therewith), for example at the front surface 30a and on the opposite side of the screen 38 with respect to the hinge 34. Furthermore, the first and the second electrodes 24a and 24b are carried by the base portion 32 and extend, for example, from sides of the base portion 32 opposite to each other with respect to the interface device 36 (e.g., on sides of the base portion 32 opposite to each other with respect to the rotation axis of the hinge 34).

Optionally, the sensor module 12 further comprises an interface circuit (not shown, and for example integrated in the charge variation sensor 22 and/or in the optical sensor 20) coupled to the electrodes 24a and 24b, to the optical sensor 20 and to the control unit 14. In particular, the interface circuit is of a known type and is configured to interface the electrodes 24a and 24b and the optical sensor 20 with the control unit 14; for example, the interface circuit comprises an amplification circuit and/or an analog-to-digital converter (ADC) and/or serial communication modules (e.g., UART, SPI, I2C, etc.), not shown.

In use, the sensor module 12 detects the electric/electrostatic charge variations in the environment through the charge variation sensor 22 and generates a corresponding charge variation signal $S_Q$ (in detail, a digital electrical signal) at output; furthermore, the sensor module 12 detects, through the optical sensor 20, the times of flight (indicative of the distance, at respective time instants, of bodies, such as inanimate objects or the user, from the optical sensor 20) and generates a corresponding time-of-flight signal $S_{ToF}$ (in detail, a digital electrical signal) at output. The charge variation signal $S_Q$ and the time-of-flight signal $S_{ToF}$ are then received by the control unit 14 which implements a control method 50 (FIG. 3) described below. In particular, in the considered case in which two electrodes 24a and 24b are present, the charge variation signal $S_Q$ is a differential signal indicative of a difference between a first and a second detection signal which are indicative of the electric/electrostatic charge variations in the environment detected through the first and the second electrodes 24a and 24b, respectively. Otherwise, in case only one electrode is present, the charge variation signal $S_Q$ is indicative of the detection signal generated by said electrode, and therefore of the electric/electrostatic charge variations measured in single-ended manner by the latter.

In detail, the optical sensor 20 detects, when activated, the first distance D of a body (indicated in FIG. 2 with the number 40, and herein considered to be the user of the apparatus 10) from the apparatus 10. The presence of the user 40 (and consequently the first distance D with respect to the optical sensor 20) is detected by the optical sensor 20 when the user 40 is in a field of view 42 of the optical sensor 20. In particular, the field of view 42 has a substantially conical shape, extends from the optical sensor 20 and has a first opening angle α (variable according to the optical sensor 20 being chosen and generally comprised between about 20° and about 40°, and for example equal to about 30°).

Furthermore, the first electrode 24a detects the presence of the user 40 in a first detection region 44a of the charge variation sensor 22, and the second electrode 24b detects the presence of the user 40 in a second detection region 44b of the charge variation sensor 22; the first and the second detection regions 44a and 44b thus form a detection region of the charge variation sensor 22. For example, the field of view 42 is arranged between the first and the second detection regions; optionally, the first and the second detection regions overlap each other in an overlap region which extends, at least partially, into the field of view 42. In particular, the extent and the shape of the detection regions 44a and 44b in the environment depend in a per se known manner on the electrodes 24a and 24b being used (e.g., geometric shape, material, etc.); in greater detail, the detection regions 44a and 44b are defined as the regions of the environment having the apparatus 10 located therein in which the respective electrodes 44a and 44b allow the detection of the presence of the user 40 with a sensitivity being greater than that obtainable elsewhere (e.g., they are defined by a sensitivity comprised between a maximum sensitivity and a minimum sensitivity, for example equal to about 10% of the maximum sensitivity).

Figure 3:
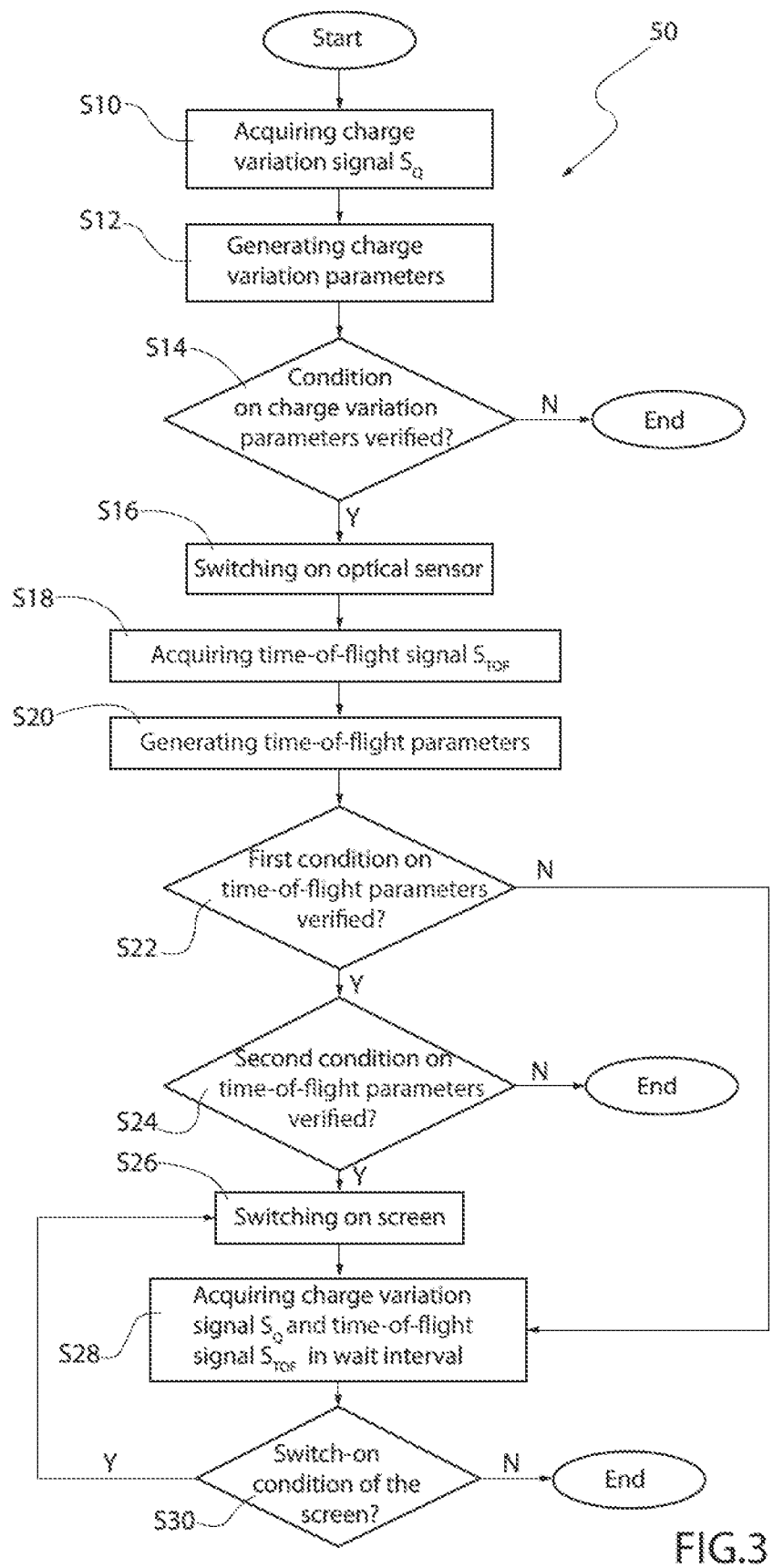
FIG. 3 is a block diagram illustrating a control method of the apparatus of FIG. 1.

FIG. 3 shows the control method 50 performed by the control unit 14 to automatically activate one or more functionalities of the apparatus 10. In particular, when the user 40 is in a position associated with the use of the apparatus 10 (also said use position of the apparatus 10, and for example when the user 40 is in front of the apparatus 10 and is substantially stationary, i.e., is not only passing in front of the apparatus 10), one or more functionalities of the apparatus 10 are activated and/or maintained active. An example of such a functionality to be activated is the switching of the apparatus 10 from a standby state to a use (or work) state, and in greater detail the switching on of the screen 38, the automatic and zero-touch access to documents saved in the apparatus 10, the quick start of the apparatus 10, the activation of the biometric recognition, the deactivation of the screen saver, the enabling or disabling of functions for energy saving and battery consumption. Otherwise, when the user 40 is not in the use position, these functionalities of the apparatus 10 are not active (e.g., the apparatus 10 is in standby).

Hereinafter, reference is exemplarily made to switching on the screen 38 as a functionality to be activated. Nevertheless, it is apparent that other functionalities may be similarly considered, in place of or in addition to switching on the screen 38.

In particular, the control method 50 is performed iteratively.

The control method 50 begins with a rest (or standby) condition of the apparatus 10, wherein the screen 38 is off, the optical sensor 20 is off and the charge variation sensor 22 is on (i.e., the detection of the electric/electrostatic charge variations is active).

At a step S10 the charge variation signal $S_Q$ is acquired through the charge variation sensor 22, for example during a first time interval (e.g., having a duration comprised between about 0.5 sec and about 2 sec) and for example with acquisition frequency equal to about 50 Hz.

At a step S12, immediately following step S10, one or more charge variation parameters are generated as a function of the charge variation signal $S_Q$, which are indicative of quantities of interest of the charge variation signal $S_Q$. According to an embodiment exemplarily considered below, at step S12 a number of peaks and/or valleys and a first variance of the charge variation signal $S_Q$ in the first time interval are calculated. Similarly, a derivative over time and/or a composition of state variables (e.g., average, median, etc.) of the charge variation signal $S_Q$ in the first time interval may be considered in place of or in addition to the number of peaks/valleys and the first variance; greater details thereof may be found in the Italian patent document 102021000012665 filed in the name of the present Applicant.

Figure 4A:
FIGS. 4A-4C and FIG. 5 are graphs of electrical signals generated by the sensor module of FIG. 1 in respective operating conditions of the apparatus.
Figure 4B:
Figure 4C:
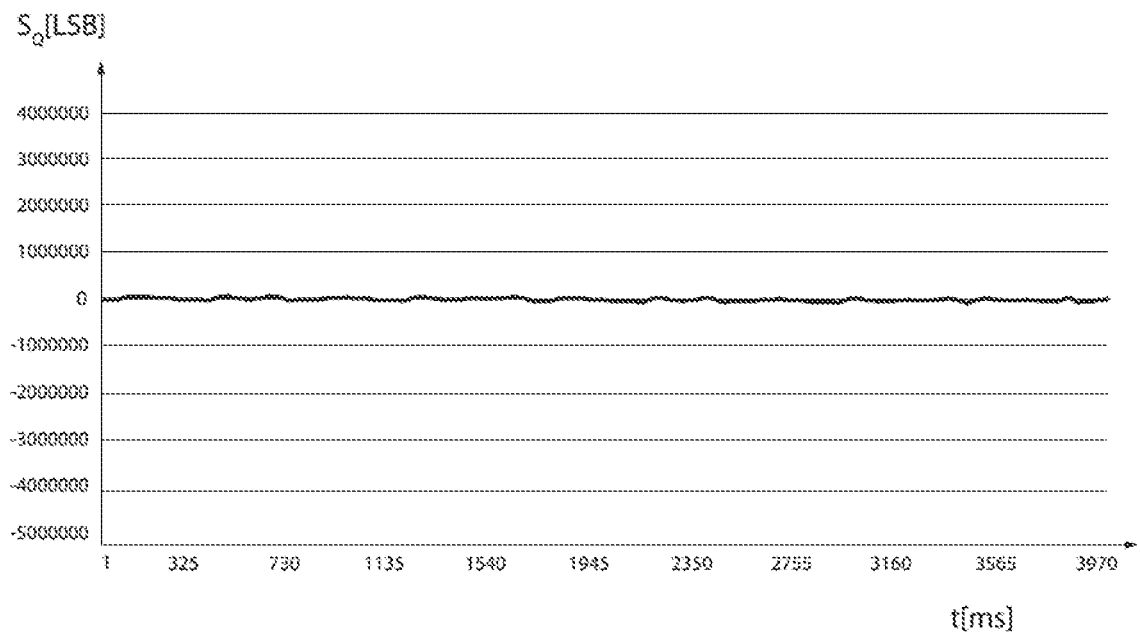

By way of example, FIG. 4A shows the charge variation signal $S_Q$ in the case in which the user 40 is in the first detection region 44a (e.g., enters, and subsequently exits, the first detection region 44a); FIG. 4B shows the charge variation signal $S_Q$ in the case in which the user 40 is in the second detection region 44b (e.g., enters, and subsequently exits, the second detection region 44b); furthermore, FIG. 4C shows the charge variation signal $S_Q$ in the absence of the user 40, i.e., in the case in which the user 40 is neither in the first nor in the second detection region 44a and 44b. In detail, the presence and movements of the user 40 in one of the first and the second detection regions 44a and 44b cause corresponding electric/electrostatic charge variations in the electrodes 24a and 24b, which are asymmetrical to each other and greater in the electrode 24a, 24b closer to the user 40 (e.g., a greater variation in the first electrode 24a than in the second electrode 24b when the user 40 enters the first detection region 44a). Since the detection signals of the electrodes 24a and 24b are acquired in a differential manner, the charge variation signal $S_Q$ initially presents (FIG. 4A) for example a valley whenever the user 40 enters the first detection region 44a (in detail, followed by a series of peaks due to the user 40 moving into the first detection region 44a, or exiting the latter); similarly, the charge variation signal $S_Q$ initially presents (FIG. 4B) for example a peak whenever the user 40 enters the second detection region 44b (in detail, followed by a series of valleys due to the user 40 moving into the second detection region 44b, or exiting the latter). Otherwise, in the case in which the user 40 is neither in the first nor in the second detection region 44a, 44b, the electric/electrostatic charge variations in the electrodes 24a and 24b are substantially null or symmetrical to each other, therefore the respective detection signals are substantially null or equal to each other and the charge variation signal $S_Q$ is approximately null. According to an exemplary and non-limiting embodiment (this is due to the fact that the charge variation signal $S_Q$ depends in a per se known manner on the type of electrodes 24a and 24b being used, and for example on their shape, on the material they are made of, etc.), the peaks/valleys of the charge variation signal $S_Q$ having a maximum absolute value being greater, in absolute value, than a threshold value for example equal to 75000 LSB are considered as charge variation parameters (therefore identifying the presence of the user 40); greater details thereof may be found in the Italian patent document 102021000012665 filed in the name of the present Applicant.

At a step S14, immediately following step S12, it is determined whether a condition on charge variation parameters is verified. In particular, the condition is verified when the number of peaks and/or valleys of the charge variation signal $S_Q$ is greater than a threshold number of peaks/valleys (e.g., equal to about 1 or 2 peaks/valleys) and/or when the first variance of the charge variation signal $S_Q$ is greater than a first threshold variance (e.g., equal to about 10 times the square of the standard deviation of the noise measured by the charge variation sensor 22, and for example equal to about 2E8 LSB).

In the event that the condition on charge variation parameters is not verified, the control method 50 ends and, for example, the method returns to step S10 to continue monitoring the presence or absence of the user 40. In fact, when the condition on charge variation parameters is not verified the user 40 is not present in the detection regions 44a and 44b (and therefore not even in the field of view 42) and therefore proceeding with the activation of the optical sensor 20 is not necessary.

In the event that the condition on charge variation parameters is verified, the optical sensor 20 is activated (step S16, immediately following step S14).

At a step S18, immediately following step S16, the time-of-flight signal $S_{ToF}$ is acquired through the optical sensor 20, for example through a scrolling buffer and during a second time interval (e.g., having a duration comprised between about 1 sec and about 2 sec).

At a step S20, immediately following step S18, time-of-flight parameters are generated as a function of the time-of-flight signal $S_{ToF}$. According to an embodiment, at step S20 the first distance D of the user 40 and a first variance of the time-of-flight signal $S_{ToF}$ in the second time interval are calculated, from the time-of-flight signal $S_{ToF}$. For example, the first distance D is equal to an average (alternatively, to a minimum or to a maximum occurrence value) of the instantaneous distances calculated, in a per se known manner, at each instant of the second time interval from the corresponding instantaneous value of the time-of-flight signal $S_{ToF}$. For example, for each new acquired sample of the time-of-flight signal $S_{ToF}$ a respective average of the values of the time-of-flight signal $S_{ToF}$ is calculated in the scrolling buffer which has a duration equal to the second time interval and which comprises said new acquired sample; the averages of the time-of-flight signal $S_{ToF}$ thus calculated are saved in a further scrolling buffer (for example having a duration of less than the second time interval, e.g., equal to half the duration of the latter), and on the basis of these averages the first variance is calculated (e.g., as the maximum value or average of the averages of the time-of-flight signal $S_{ToF}$ in said buffer).

At a step S22, immediately following step S20, it is determined whether a first condition on time-of-flight parameters is verified. In particular, the first condition on time-of-flight parameters is verified when the first variance of the time-of-flight signal $S_{ToF}$ is greater than a second threshold variance (e.g., equal to about 2 mm$^2$) and the first distance D is less than a first threshold distance (for example equal to about 50 cm). In other words, the first condition on time-of-flight parameters allows determining whether the user 40 is present or not in the field of view 42 (the presence of the user 40 being here intended both as a temporary passage through the field of view 42 and as a steady presence over time of the user 40 in the field of view 42, e.g., the user 40 sitting in front of the apparatus 10).

In the event that the first condition on time-of-flight parameters is not verified, a step S28, better described below, is performed.

In the event that the first condition on time-of-flight parameters is verified, it is determined (step S24, immediately following step S22) whether a second condition on time-of-flight parameters is verified. In particular, the second condition on time-of-flight parameters is verified when the first distance D is less than the first threshold distance for a time period being greater than a threshold period (e.g., less than the second time interval and for example equal to about 0.5 sec). In other words, the second condition on time-of-flight parameters allows determining the steady presences of the user 40 in the field of view 42 (e.g., the user 40 sitting in front of the apparatus 10 and not only in transit through the field of view 42).

In the event that the second condition on time-of-flight parameters is not verified, the control method 50 ends as the user 40 is not in the use position of the apparatus 10 and, for example, the method returns to step S10 to continue monitoring the presence or absence of the user 40 through the charge variation sensor 22.

In the event that the second condition on time-of-flight parameters is verified, the screen 38 is switched on at a step S26 immediately following step S24 (more generally, the functionalities to be activated of the apparatus 10 are activated), as the use position of the user 40 useful for the use of the apparatus 10 has been detected.

After switching on the screen 38, the latter remains on for a wait interval that is greater than the first and the second time intervals and is for example equal to about 30 seconds. During the wait interval, the charge variation signal $S_Q$ and the time-of-flight signal $S_{ToF}$ are acquired at a step S28 immediately following step S26.

Furthermore, at step S28, mixed parameters indicative of quantities of interest of the charge variation signal $S_Q$ and of the time-of-flight signal $S_{ToF}$ are generated as a function of the charge variation signal $S_Q$ and of the time-of-flight signal $S_{ToF}$. In particular, according to an exemplarily considered embodiment, a second variance of the charge variation signal $S_Q$ in the wait interval and a second variance of the time-of-flight signal $S_{ToF}$ in the wait interval are calculated similarly to what has been previously described.

At a step S30, immediately following step S28, it is determined whether a functionality activation condition is verified, and in detail in the considered example whether a switch-on condition of the screen is verified. The functionality activation condition is based on mixed parameters and, in particular, is verified when the second variance of the charge variation signal $S_Q$ is greater than a third threshold variance (e.g., equal to about 2 mm$^2$) and when the second variance of the time-of-flight signal $S_{ToF}$ is greater than a fourth threshold variance (e.g., equal to about 2 mm$^2$).

In the event that the functionality activation condition is verified, the method returns to step S26 and therefore the screen 38 is maintained on again for the duration of the wait interval (more generally, the functionalities to be activated of the apparatus 10 are maintained active), as the position of the user 40 useful for the use of the apparatus 10 has been confirmed.

In the event that the functionality activation condition is not verified, the control method 50 ends and, for example, the method returns to step S10 to continue monitoring the presence or absence of the user 40. In fact, when the functionality activation condition is not verified the user 40 has moved during the wait interval and is no longer present neither in the detection regions 44a and 44b nor in the field of view 42 (therefore he/she is no longer in the use position of the apparatus 10).

Furthermore, as previously mentioned, in the event that the first condition on time-of-flight parameters is not verified at step S22, the control method 50 continues with step S28 and therefore the method proceeds verifying the functionality activation condition only after the wait time has elapsed. In this manner, even if the optical sensor 20 has not detected the user 40 in the use position of the apparatus 10, the optical sensor 20 remains still active for the duration of the wait interval after the charge variation sensor 22 has detected a movement. In other words, the optical sensor 20 remains active as long as a further control (step S30) is performed to confirm the absence or determine the presence of the user 40, improving the accuracy of detection.

From an examination of the characteristics of the disclosure made according to the present disclosure, the advantages that it affords are evident.

In particular, the control method 50 allows the energy consumption to be limited by activating the optical sensor 20 only following a first detection of the user 40 by the charge variation sensor 22.

Furthermore, the use of the charge variation sensor 22 allows an initial detection of the user 40 to be performed in a space being greater than that of the field of view 42 of the optical sensor 20 only, thus increasing the overall detection effectiveness.

In addition, the control method 50 allows to discriminate between passages of the user 40 through the field of view 42 but without actual use of the apparatus, and cases in which the user 40 is actually in the use position of the apparatus 10.

Finally, it is clear that modifications and variations may be made to the disclosure described and illustrated herein without thereby departing from the scope of the present disclosure. For example, the different embodiments described may be combined to provide further solutions.

The optical sensor 20 may be brought, by the apparatus 10, to a different position with respect to what has been previously discussed, or it may be operatively coupled thereto without being physically fixed to the apparatus 10. Similar considerations apply to the electrodes 24a and 24b, which may be operatively coupled to the apparatus 10 and/or be in a different (e.g., greater) number and/or in different positions with respect to what has been previously described. The only relevant aspect is that the detection regions 44a and 44b and the field of view 42 are oriented in such a way as to detect the user 40 in the use position of the apparatus 10. In the case of more than two electrodes 24, the respective detection signals may be combined mutually and in a known manner to generate the charge variation signal $S_Q$ (e.g., in the case of four electrodes arranged at the corners of the base portion 32, the detection signals of the electrodes arranged on the same side, transverse to the rotation axis, of the base portion 32 are added to each other and acquired in a differential manner with respect to the sum of the detection signals of the electrodes on the side of the base portion 32 opposite to the rotation axis).

Furthermore, the charge variation sensor 22 may comprise some shielding elements (not shown, and for example some metal sheets put to a reference potential, e.g., to ground) for selectively shielding the electrodes 24a, 24b from static or quasi-static electric fields coming from predefined directions. For example, the electrodes 24a and 24b may be shielded through the respective shielding elements from electric fields coming from behind the apparatus 10 (e.g., impinging on a rear surface of the lid portion 20, opposite to the front surface 30a), while they are sensitive to electric fields coming from the opposite direction (e.g., impinging on the front surface 30a of the lid portion 20 and coming from the use position of the apparatus 10).

Furthermore, the optical sensor 20 may be replaced by a more generic proximity sensor (e.g., optical sensor, temperature sensor, acoustic sensor, ultrasonic sensor or microwave radar) for detecting a proximity signal (e.g., the time-of-flight signal $S_{ToF}$) indicative of the first distance D of the user 40 from the apparatus 10. According to this embodiment and similarly to what has been previously discussed, at step S20 proximity parameters (e.g., the time-of-flight parameters) are generated, at step S22 a first condition on proximity parameters (e.g., the first condition on time-of-flight parameters) is verified, and at step S24 a second condition on proximity parameters (e.g., the second condition on time-of-flight parameters) is verified.

The optical sensor 20 may comprise a plurality of optical sub-sensors (or, more generally, proximity sub-sensors), for example with a matrix arrangement, to increase the overall field of view 42. In fact, each optical sub-sensor measures a respective first sub-distance of the user 40 therefrom; therefore, the field of view 42 is formed by the sub-fields of view (e.g., it is the union thereof) and the first distance D is a function (e.g., average or minimum) of said first sub-distances. Similarly, a plurality of optical sensors 20 may be considered to increase the overall field of view.

Additionally or alternatively to what has been previously described with reference to steps S28 and S30, the mixed parameters may comprise quantities being different from the second variances: for example, they may comprise respective averages or respective maximum values of the charge variation signal $S_Q$ and of the time-of-flight signal $S_{ToF}$, or may comprise the respective numbers of peaks and/or valleys of the charge variation signal $S_Q$ and of the time-of-flight signal $S_{ToF}$ with an absolute value being greater than a threshold value (e.g., the functionality activation condition is verified when at least three peaks/valleys of the charge variation signal $S_Q$ and at least three peaks/valleys of the time-of-flight signal $S_{ToF}$ have a value being greater than the threshold value).

Furthermore, it is possible to acquire information on the second distance D between the user 40 and the apparatus 10 also from the charge variation signal $S_Q$. In fact, as exemplarily shown in FIG. 5, the peaks and valleys of the charge variation signal $S_Q$ have amplitudes that depend on the second distance D and, in particular, depend on a third distance between the user 40 and the electrodes 24a and 24b which is correlated to the second distance D. In particular, the third distance is a function, due to known trigonometric considerations, of the second distance D of the user 40 with respect to the apparatus 10 (e.g., it is substantially coincident with the second distance D when the electrodes 24a and 24b are carried by the apparatus 10 and are in proximity to the optical sensor 20). In greater detail, the third distance is calculated as a function of the charge variation signal $S_Q$ obtained through the electrodes 24a and 24b, and may be considered as an average distance of the user 40 from the charge variation sensor 22.

Figure 5:
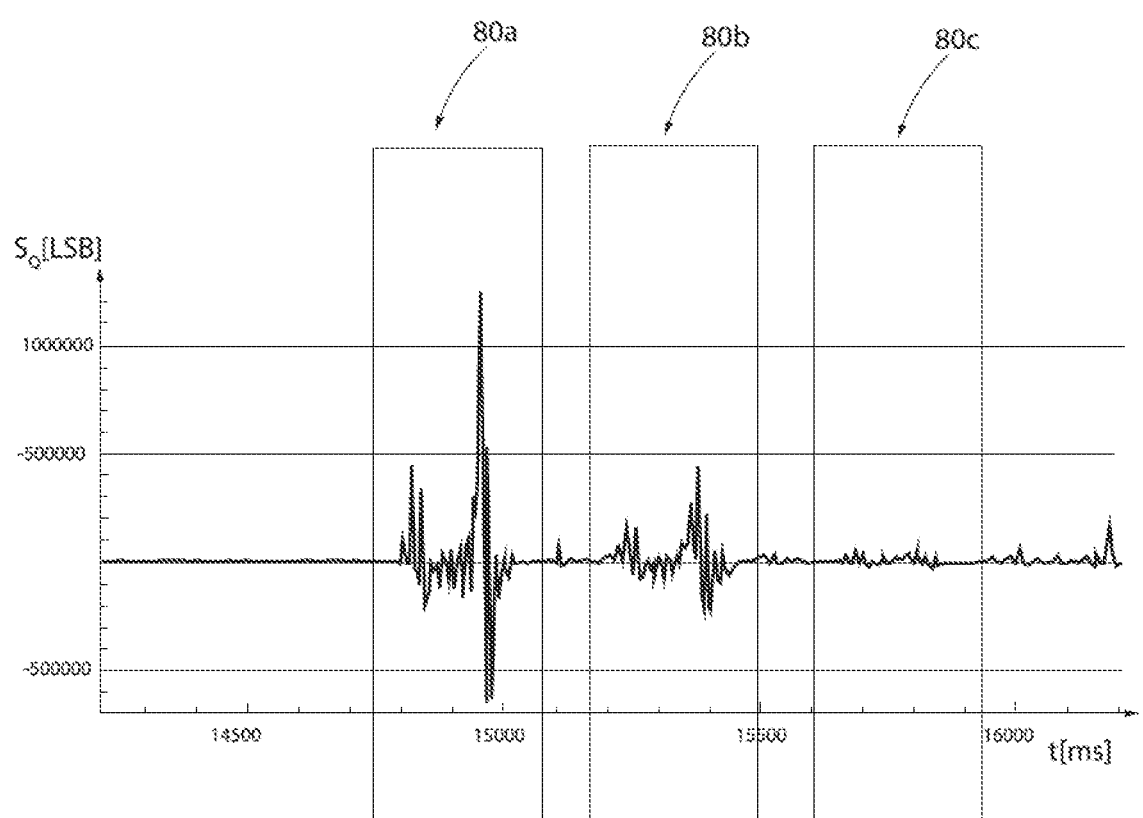

For example, FIG. 5 shows the charge variation signal $S_Q$ which comprises three portions, in three respective time periods subsequent to each other, indicated with the numbers 80a, 80b and 80c and relating to third distances being different from each other (in detail, increasing as time increases): in the portion 80a the third distance is minimum and the amplitude of peaks and valleys is maximum, while in the portion 80c the third distance is maximum and the amplitude of peaks and valleys is minimum.

Consequently, a new step (not shown, between step S14 and step S16) may be introduced in the control method 50 wherein, when the condition on charge variation parameters is verified: the third distance is calculated from the one or more detection signals of the charge variation sensor 22; and it is determined whether an initial distance condition is verified. In detail, it is determined whether the third distance is less than a second threshold distance, for example equal to the first threshold distance (similarly, whether the amplitude of a maximum peak/valley is greater than a maximum amplitude). If the initial distance condition is verified, the method proceeds to step S16 as the user 40 is sufficiently close to the apparatus 10, otherwise the control method 50 ends and for example the method returns to step S10.

Furthermore, although a plurality of parameters (the charge variation parameters, the proximity parameters, etc.) have been discussed so far, it is clear that similar considerations apply in the case of single parameters (a charge variation parameter, a proximity parameter, etc.).

A control method (50) of an apparatus (10) for activating one or more functionalities of the apparatus (10), the apparatus (10) being usable by a user (40) and may be summarized as including a control unit (14) operatively coupled to a proximity sensor (20) configured to detect, when the user (40) is in a field of view (42) of the proximity sensor (20), a first distance (D) of the user (40) from the proximity sensor (20) correlated to a second distance of the user (40) from the apparatus (10); and a charge variation sensor (22) configured to detect an electric and/or electrostatic charge variation caused by the presence of the user (40) in a detection region (44a, 44b) of the charge variation sensor (22), the control method comprising the steps of: acquiring (S10), by the control unit (14) and through the charge variation sensor (22), a charge variation signal (Se) indicative of the presence or absence of the user (40) in the detection region (44a, 44b); generating (S12), by the control unit (14), one or more charge variation parameters as a function of the charge variation signal (Se); determining (S14), by the control unit (14), whether a condition on charge variation parameters is verified, the condition on charge variation parameters being indicative of the presence of the user (40) in the detection region (44a, 44b); if the condition on charge variation parameters is verified, activating (S16) the proximity sensor (20) and acquiring (S18), by the control unit (14) and through the proximity sensor (20), a proximity signal ($S_{ToF}$) indicative of the presence or absence of the user (40) in the field of view (42) and of the first distance (D); generating (S20), by the control unit (14), one or more proximity parameters as a function of the proximity signal ($S_{ToF}$); determining (S22, S24), by the control unit (14), whether a condition on proximity parameters is verified, the condition on proximity parameters being indicative of the fact that the user (40) is, in the field of view (42), in a use position of the apparatus (10); and if the condition on proximity parameters is verified, activating (S26), by the control unit (14), said one or more functionalities of the apparatus (10).

The step of generating (S12) the one or more charge variation parameters may include calculating a number of peaks and/or valleys of the charge variation signal (Se) in a first time interval, and calculating a first variance of the charge variation signal (Se) in the first time interval, and the step of determining (S14) whether the condition on charge variation parameters is verified may include verifying whether the number of peaks and/or valleys of the charge variation signal (Se) in the first time interval is greater than a threshold number and/or whether the first variance of the charge variation signal (Se) in the first time interval is greater than a first threshold variance.

The step of generating (S20) the one or more proximity parameters may include: calculating, as a function of the proximity signal ($S_{ToF}$) in a second time interval, the first distance (D); and calculating a first variance of the proximity signal ($S_{ToF}$) in the second time interval.

The step of determining (S22, S24) whether the condition on proximity parameters is verified may include determining (S22) whether a first condition on proximity parameters is verified and, if the first condition on proximity parameters is verified, determining (S24) whether a second condition on proximity parameters is verified, wherein the first condition on proximity parameters may be indicative of the presence of the user (40) in the field of view (42), and the second condition on proximity parameters may be indicative of said use position of the user (40), wherein the apparatus (10) may be usable by the user (40).

The step of determining (S22) whether the first condition on proximity parameters may be verified may include verifying whether the first variance of the proximity signal ($S_{ToF}$) in the second time interval may be greater than a second threshold variance and whether the first distance (D) in the second time interval may be lower than a first threshold distance.

The step of determining (S24) whether the second condition on proximity parameters is verified may include verifying whether the first distance (D) in the second time interval may be lower than the first threshold distance for a time period being greater than a threshold period.

The control method may further include, subsequently to the step of activating (S26) said one or more functionalities of the apparatus (10), the steps of: a. acquiring (S28), by the control unit (14) and through the charge variation sensor (22) and the proximity sensor (20), the charge variation signal ($S_Q$) and the proximity signal ($S_{ToF}$) in a wait interval; b. generating (S28), by the control unit (14), one or more mixed parameters as a function of the proximity signal ($S_{ToF}$) and of the charge variation signal ($S_Q$); c. determining (S30), by the control unit (14), whether a condition on mixed parameters is verified, the condition on mixed parameters being indicative of the fact that the user (40) is in the use position of the apparatus (10) during the wait interval; and d. if the condition on mixed parameters is verified, maintaining active (S26), by the control unit (14), said one or more functionalities of the apparatus (10).

The step of generating (S28) one or more mixed parameters may include calculating a second variance of the charge variation signal ($S_Q$) in the wait interval and calculating a second variance of the proximity signal ($S_{ToF}$) in the wait interval, and the step of determining (S30) whether the condition on mixed parameters is verified comprises verifying whether the second variance of the charge variation signal ($S_Q$) is greater than a third threshold variance and whether the second variance of the proximity signal ($S_{ToF}$) is greater than a fourth threshold variance.

The control method may further include, if the condition on proximity parameters is not verified, the steps of: performing said steps a. to c.; and if the condition on mixed parameters is verified, activating (S26), by the control unit (14), said one or more functionalities of the apparatus (10).

The control method may further include, if the condition on charge variation parameters is verified, the steps of: determining, by the control unit (14) and as a function of the charge variation signal ($S_Q$), a third distance of the user (40) from the charge variation sensor (22) correlated to the second distance of the user (40) from the apparatus (10); and determining, by the control unit (14), whether an initial distance condition is verified, the initial distance condition being indicative of the fact that the third distance is lower than a second threshold distance, and the steps of activating (S16) the proximity sensor (20) and acquiring (S18) the proximity signal ($S_{ToF}$) may be performed if the initial distance condition is verified.

The step of activating (S26) said one or more functionalities of the apparatus (10) may include at least one of the following: switching of the apparatus (10) from a standby state to a use state; switching on of a screen (38) of the apparatus (10); automatic access to documents present in the apparatus (10); automatic start of activities by the apparatus (10); activation of a biometric recognition by the apparatus (10); deactivation of a screen saver of the apparatus (10); enabling or disabling of energy saving functions of the apparatus (10).

A computer program product may be summarized as including being storable in a control unit (14) of an apparatus (10) usable by a user (40) and operatively coupled to a proximity sensor (20) configured to detect, when the user (40) is in a field of view (42) of the proximity sensor (20), a first distance (D) of the user (40) from the proximity sensor (20) correlated to a second distance of the user (40) from the apparatus (10); and a charge variation sensor (22) configured to detect an electric and/or electrostatic charge variation caused by the presence of the user (40) in a detection region (44a, 44b) of the charge variation sensor (22), said computer program being designed in such a way that, when executed, the control unit (14) becomes configured to implement a control method (50) of the apparatus (10) for activating one or more functionalities of the apparatus (10).

A control unit (14) for an apparatus (10) may be summarized as including being usable by a user (40), the control unit (14) being operatively coupled to a proximity sensor (20) configured to detect, when the user (40) is in a field of view (42) of the proximity sensor (20), a first distance (D) of the user (40) from the proximity sensor (20) correlated to a second distance of the user (40) from the apparatus (10); and a charge variation sensor (22) configured to detect an electric and/or electrostatic charge variation caused by the presence of the user (40) in a detection region (44a, 44b) of the charge variation sensor (22), the control unit (14) being configured to acquire (S10), through the charge variation sensor (22), a charge variation signal (Se) indicative of the presence or absence of the user (40) in the detection region (44a, 44b); generate (S12) one or more charge variation parameters as a function of the charge variation signal (Se); determine (S14) whether a condition on charge variation parameters is verified, the condition on charge variation parameters being indicative of the presence of the user (40) in the detection region (44a, 44b); if the condition on charge variation parameters is verified, activate (S16) the proximity sensor (20) and acquire (S18), through the proximity sensor (20), a proximity signal ($S_{ToF}$) indicative of the presence or absence of the user (40) in the field of view (42) and of the first distance (D); generate (S20) one or more proximity parameters as a function of the proximity signal ($S_{ToF}$); determine (S22, S24) whether a condition on proximity parameters is verified, the condition on proximity parameters being indicative of the fact that the user (40) is, in the field of view (42), in a use position of the apparatus (10); and if the condition on proximity parameters is verified, activate (S26) one or more functionalities of the apparatus (10).

An apparatus (10) may be summarized as including being usable by a user (40) and comprising a control unit (14) operatively coupled to a proximity sensor (20) configured to detect, when the user (40) is in a field of view (42) of the proximity sensor (20), a first distance (D) of the user (40) from the proximity sensor (20) correlated to a second distance of the user (40) from the apparatus (10); and a charge variation sensor (22) configured to detect an electric and/or electrostatic charge variation caused by the presence of the user (40) in a detection region (44a, 44b) of the charge variation sensor (22), the control unit (14) being configured to acquire (S10), through the charge variation sensor (22), a charge variation signal (Se) indicative of the presence or absence of the user (40) in the detection region (44a, 44b); generate (S12) one or more charge variation parameters as a function of the charge variation signal (Se); determine (S14) whether a condition on charge variation parameters is verified, the condition on charge variation parameters being indicative of the presence of the user (40) in the detection region (44a, 44b); if the condition on charge variation parameters is verified, activate (S16) the proximity sensor (20) and acquire (S18), through the proximity sensor (20), a proximity signal ($S_{ToF}$) indicative of the presence or absence of the user (40) in the field of view (42) and of the first distance (D); generate (S20) one or more proximity parameters as a function of the proximity signal ($S_{ToF}$); determine (S22, S24) whether a condition on proximity parameters is verified, the condition on proximity parameters being indicative of the fact that the user (40) is, in the field of view (42), in a use position of the apparatus (10); and if the condition on proximity parameters is verified, activate (S26) one or more functionalities of the apparatus (10).

The proximity sensor (20) and the charge variation sensor (22) may be included in, and/or carried by, the apparatus (10), and the first distance (D) may be equal to the second distance.

The charge variation sensor (22) may include a first electrode (24a) configured to generate a first detection signal indicative of the respective electric and/or electrostatic charge variation detected in a first detection region (44a) of the charge variation sensor (22), and may include a second electrode (24b) configured to generate a second detection signal indicative of the respective electric and/or electrostatic charge variation detected in a second detection region (44b) of the charge variation sensor (22), the first (44a) and the second (44b) detection regions forming said detection region (44a, 44b), and the charge variation signal (Se) may be generated as a function of the first detection signal and of the second detection signal.

The charge variation signal ($S_Q$) may be generated as a function of a difference between the first detection signal and the second detection signal.

The field of view (42) may be at least partially overlapped on the detection region (44a, 44b).

The proximity sensor (20) may be an optical sensor of time-of-flight type.

The proximity sensor (20) may include a plurality of proximity sub-sensors each configured to detect, when the user (40) may be in a respective sub-field of view of the proximity sub-sensor, a respective first sub-distance of the user (40) from the proximity sub-sensor, the field of view (42) being formed by the sub-fields of view and the first distance (D) being a function of said first sub-distances.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control method of an apparatus for activating one or more functionalities of the apparatus,
the apparatus being usable by a user and comprising a control unit operatively coupled to:
a proximity sensor configured to detect, when the user is in a field of view of the proximity sensor, a first distance of the user from the proximity sensor correlated to a second distance of the user from the apparatus; and
a charge variation sensor configured to detect an electric or electrostatic charge variation caused by the presence of the user in a detection region of the charge variation sensor,
the control method comprising:
acquiring, by the control unit and through the charge variation sensor, a charge variation signal indicative of the presence or absence of the user in the detection region;
generating, by the control unit, one or more charge variation parameters as a function of the charge variation signal;
determining, by the control unit, whether a condition on charge variation parameters is verified, the condition on charge variation parameters being indicative of the presence of the user in the detection region;
in response to the condition on charge variation parameters being verified, activating the proximity sensor and acquiring, by the control unit and through the proximity sensor, a proximity signal indicative of the presence or absence of the user in the field of view of the proximity sensor and of the first distance;
generating, by the control unit, one or more proximity parameters as a function of the proximity signal;
determining, by the control unit, whether a condition on proximity parameters is verified, the condition on proximity parameters being indicative of the user being in the field of view of the proximity sensor and in a use position of the apparatus; and
in response to the condition on proximity parameters being verified, activating, by the control unit, said one or more functionalities of the apparatus.

2. The control method according to claim 1, wherein generating the one or more charge variation parameters comprises calculating a number of peaks or valleys of the charge variation signal in a first time interval, and calculating a first variance of the charge variation signal in the first time interval, and
wherein determining whether the condition on charge variation parameters is verified comprises verifying whether the number of peaks or valleys of the charge variation signal in the first time interval is greater than a threshold number or whether the first variance of the charge variation signal in the first time interval is greater than a first threshold variance.

3. The control method according to claim 1, wherein generating the one or more proximity parameters comprises:
calculating, as a function of the proximity signal in a second time interval, the first distance; and
calculating a first variance of the proximity signal in the second time interval.

4. The control method according to claim 3, wherein determining whether the condition on proximity parameters is verified comprises determining whether a first condition on proximity parameters is verified and, in response to the first condition on proximity parameters being verified, determining whether a second condition on proximity parameters is verified,
wherein the first condition on proximity parameters is indicative of the presence of the user in the field of view of the proximity sensor, and
wherein the second condition on proximity parameters is indicative of said use position of the user, wherein the apparatus is usable by the user.

5. The control method according to claim 4, wherein determining whether the first condition on proximity parameters is verified comprises verifying whether the first variance of the proximity signal in the second time interval is greater than a second threshold variance and whether the first distance in the second time interval is lower than a first threshold distance.

6. The control method according to claim 5, wherein determining whether the second condition on proximity parameters is verified comprises verifying whether the first distance in the second time interval is lower than the first threshold distance for a time period being greater than a threshold period.

7. The control method according to claim 1, further comprising, subsequently to the activating said one or more functionalities of the apparatus:
a. acquiring, by the control unit and through the charge variation sensor and the proximity sensor, the charge variation signal and the proximity signal in a wait interval;
b. generating, by the control unit, one or more mixed parameters as a function of the proximity signal and of the charge variation signal;
c. determining, by the control unit, whether a condition on mixed parameters is verified, the condition on mixed parameters being indicative of the user being in the use position of the apparatus during the wait interval; and
d. in response to the condition on mixed parameters being verified, maintaining active, by the control unit, said one or more functionalities of the apparatus.

8. The control method according to claim 7, wherein generating one or more mixed parameters comprises calculating a second variance of the charge variation signal in the wait interval and calculating a second variance of the proximity signal in the wait interval, and
wherein determining whether the condition on mixed parameters is verified comprises verifying whether the second variance of the charge variation signal is greater than a third threshold variance and whether the second variance of the proximity signal is greater than a fourth threshold variance.

9. The control method according to claim 7, further comprising, in response to the condition on proximity parameters not being verified:
   performing said steps a. to c.; and
   in response to the condition on mixed parameters being verified, activating, by the control unit, said one or more functionalities of the apparatus.

10. The control method according to claim 1, further comprising, in response to the condition on charge variation parameters being verified:
   determining, by the control unit and as a function of the charge variation signal, a third distance of the user from the charge variation sensor correlated to the second distance of the user from the apparatus; and
   determining, by the control unit, whether an initial distance condition is verified, the initial distance condition being indicative the third distance being lower than a second threshold distance,
   wherein the activating the proximity sensor and acquiring the proximity signal are performed in response to the initial distance condition being verified.

11. The control method according to claim 1, wherein activating said one or more functionalities of the apparatus comprises at least one of the following: switching of the apparatus from a standby state to a use state; switching on of a screen of the apparatus; automatic access to documents present in the apparatus; automatic start of activities by the apparatus; activation of a biometric recognition by the apparatus; deactivation of a screen saver of the apparatus; enabling or disabling of energy saving functions of the apparatus.

12. A computer program product storable in a control unit of an apparatus usable by a user and operatively coupled to:
   a proximity sensor configured to detect, when the user is in a field of view of the proximity sensor, a first distance of the user from the proximity sensor correlated to a second distance of the user from the apparatus; and
   a charge variation sensor configured to detect an electric or electrostatic charge variation caused by the presence of the user in a detection region of the charge variation sensor,
   said computer program, when executed, causes the control unit to implement a control method of the apparatus for activating one or more functionalities of the apparatus, the control method including:
      acquiring, by the control unit and through the charge variation sensor, a charge variation signal indicative of the presence or absence of the user in the detection region;
      generating, by the control unit, one or more charge variation parameters as a function of the charge variation signal;
      determining, by the control unit, whether a condition on charge variation parameters is verified, the condition on charge variation parameters being indicative of the presence of the user in the detection region;
      in response to the condition on charge variation parameters being verified, activating the proximity sensor and acquiring, by the control unit and through the proximity sensor, a proximity signal indicative of the presence or absence of the user in the field of view of the proximity sensor and of the first distance;
      generating, by the control unit, one or more proximity parameters as a function of the proximity signal;
      determining, by the control unit, whether a condition on proximity parameters is verified, the condition on proximity parameters being indicative of the user being in the field of view of the proximity sensor and in a use position of the apparatus; and
      in response to the condition on proximity parameters being verified, activating, by the control unit, said one or more functionalities of the apparatus.

13. A control unit for an apparatus usable by a user, the control unit being operatively coupled to:
   a proximity sensor configured to detect, when the user is in a field of view of the proximity sensor, a first distance of the user from the proximity sensor correlated to a second distance of the user from the apparatus; and
   a charge variation sensor configured to detect an electric or electrostatic charge variation caused by the presence of the user in a detection region of the charge variation sensor,
   the control unit being configured to:
      acquire, through the charge variation sensor, a charge variation signal indicative of the presence or absence of the user in the detection region;
      generate one or more charge variation parameters as a function of the charge variation signal;
      determine whether a condition on charge variation parameters is verified, the condition on charge variation parameters being indicative of the presence of the user in the detection region;
      in response the condition on charge variation parameters being verified, activate the proximity sensor and acquire, through the proximity sensor, a proximity signal indicative of the presence or absence of the user in the field of view of the proximity sensor and of the first distance;
      generate one or more proximity parameters as a function of the proximity signal;
      determine whether a condition on proximity parameters is verified, the condition on proximity parameters being indicative of the user being in the field of view of the proximity sensor and in a use position of the apparatus; and
      in response to the condition on proximity parameters being verified, activate one or more functionalities of the apparatus.

14. An apparatus usable by a user and comprising a control unit operatively coupled to:
   a proximity sensor configured to detect, when the user is in a field of view of the proximity sensor, a first distance of the user from the proximity sensor correlated to a second distance of the user from the apparatus; and
   a charge variation sensor configured to detect an electric or electrostatic charge variation caused by the presence of the user in a detection region of the charge variation sensor,
   the control unit being configured to:
      acquire, through the charge variation sensor, a charge variation signal indicative of the presence or absence of the user in the detection region;
      generate one or more charge variation parameters as a function of the charge variation signal;
      determine whether a condition on charge variation parameters is verified, the condition on charge variation parameters being indicative of the presence of the user in the detection region;

in response to the condition on charge variation parameters being verified, activate the proximity sensor and acquire, through the proximity sensor, a proximity signal indicative of the presence or absence of the user in the field of view of the proximity sensor and of the first distance;

generate one or more proximity parameters as a function of the proximity signal;

determine whether a condition on proximity parameters is verified, the condition on proximity parameters being indicative of the user being in the field of view of the proximity sensor and in a use position of the apparatus; and in response to the condition on proximity parameters being verified, activate one or more functionalities of the apparatus.

15. The apparatus according to claim 14, wherein the proximity sensor and the charge variation sensor are included as part of the apparatus or are carried by the apparatus, and wherein the first distance is equal to the second distance.

16. The apparatus according to claim 14, wherein the charge variation sensor comprises a first electrode configured to generate a first detection signal indicative of the respective electric or electrostatic charge variation detected in a first detection region of the charge variation sensor, and comprises a second electrode configured to generate a second detection signal indicative of the respective electric or electrostatic charge variation detected in a second detection region of the charge variation sensor, the first and the second detection regions forming said detection region, and wherein the charge variation signal is generated as a function of the first detection signal and of the second detection signal.

17. The apparatus according to claim 16, wherein the charge variation signal is generated as a function of a difference between the first detection signal and the second detection signal.

18. The apparatus according to claim 14, wherein the field of view of the proximity sensor is at least partially overlapped on the detection region, and the detection region is larger than the field of view of the proximity sensor.

19. The apparatus according to claim 14, wherein the proximity sensor is a time-of-flight optical sensor.

20. The apparatus according to claim 14, wherein the proximity sensor comprises a plurality of proximity sub-sensors each configured to detect, when the user is in a respective sub-field of view of the proximity sub-sensor, a respective first sub-distance of the user from the proximity sub-sensor, the field of view of the proximity sensor being formed by the sub-fields of view and the first distance being a function of said first sub-distances.

* * * * *